United States Patent
Handlogten et al.

(10) Patent No.: US 7,231,479 B2
(45) Date of Patent: Jun. 12, 2007

(54) ROUND ROBIN SELECTION LOGIC IMPROVES AREA EFFICIENCY AND CIRCUIT SPEED

(75) Inventors: Glen Howard Handlogten, Rochester, MN (US); Peichun Peter Liu, Austin, TX (US); Jieming Qi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 10/738,721

(22) Filed: Dec. 17, 2003

(65) Prior Publication Data

US 2005/0138055 A1    Jun. 23, 2005

(51) Int. Cl.
    G06F 13/14   (2006.01)
    G06F 13/36   (2006.01)
    G06F 12/00   (2006.01)
    H04L 12/43   (2006.01)

(52) U.S. Cl. .............. 710/244; 710/113; 710/240; 370/461

(58) Field of Classification Search ............. 710/244, 710/113, 240; 370/461
    See application file for complete search history.

(56) References Cited

U.S. PATENT DOCUMENTS

| | | | | |
|---|---|---|---|---|
| 5,274,785 A | * | 12/1993 | Kuddes et al. | 710/111 |
| 5,303,382 A | * | 4/1994 | Buch et al. | 710/244 |
| 5,898,694 A | * | 4/1999 | Ilyadis et al. | 370/462 |
| 6,556,571 B1 | * | 4/2003 | Shahrier et al. | 370/395.4 |
| 6,807,171 B1 | * | 10/2004 | Chow et al. | 370/389 |
| 6,868,529 B1 | * | 3/2005 | Frannhagen | 716/1 |
| 6,954,812 B2 | * | 10/2005 | Lavigne | 710/243 |
| 6,978,329 B1 | * | 12/2005 | Harral | 710/116 |
| 2004/0210696 A1 | * | 10/2004 | Meyer et al. | 710/240 |

\* cited by examiner

*Primary Examiner*—Mark H. Rinehart
*Assistant Examiner*—Christopher Daley
(74) *Attorney, Agent, or Firm*—Carr LLP; D'Ann N. Rifai

(57) ABSTRACT

A method and apparatus are provided for efficiently operating a round robin arbitration system in a given computer system. The system utilizes a series of banks of requestors and pointer. The banks of requestors and pointers operate on sequential AND-OR-Inverter/OR-AND-Inverter (AOI/OAI) logic to advance the pointer and efficiently select those requestors with pending requests. The use of the AOI/OAI logic circuitry in the banks of requestors and pointers allows for efficient selection and minimization of complex circuitry reducing the overall circuit area.

11 Claims, 3 Drawing Sheets

ROUND ROBIN SELECTION LOGIC IMPROVES AREA EFFICIENCY AND CIRCUIT SPEED

BACKGROUND OF THE INVENTION

1. Field of the Invention

The present invention relates generally to a round robin arbitration system commonly utilized for resource management within a computer system and, more particularly, to a modification to both the procedure and the circuitry or architecture of a round robin arbitration system to improve both its speed and efficiency.

2. Description of the Related Art

Within a given computer system, such as a Broadband Engine, there exists only a finite number of resources. These resources are commonly referred to as shared resources. Typically, though, there is not a single request for a given shared resource. Instead, there are usually multiple requestors competing for shared resources. These requests must be managed in such a way as to optimize the use of the architecture construct, so as to have the most rapid response and limit the wasting of resources.

A component of the resource management scheme is the round robin arbitration system. Within a round robin system, there exist arrays of sequential logic that arbitrate uses among multiple requestors. The array consists of multiple banks of requestors, for example M banks. Within each bank, there exists a latch for each requestor, for example N requestors. There can be very large numbers of both banks and requestors, thus, making the M×N array very large. Hence, it is advantageous to simplify the round robin system and to make it efficient.

In conventional systems, there are two manners in which the round robin arbitration could be accomplished. There is the complex array, which maintains a large hardwired logic array to arbitrate. Also, there is simple pattern array where there is a series of simple logic patterns to arbitrate.

Regarding the complex array, which is more common, a large complex array of logic gates is assembled. The complex logic gate array requires a large spatial area with numerous physical wirings. Hence, one problem is that the numerous physical wirings are difficult to create. Also, one must remember that these arrays or matrices of requestors may be sparse. In other words, not every requestor has a pending request in each bank at a given time. The array of logic gates determines the sparseness and the priority of uses among the competing requestors. However, if there are a very large number of banks, requestors, or both, the equations governing such a logic gate array's arbitration become nearly unmanageable. Hence, for a very complex system, a complex array of logic gates is not feasible.

With the second example, a series of very simple logic gate patterns are utilized. The series of simple logic gate patterns operating on a principle nearly inverse to that of the large logic gate arrays. The simple logic patterns cycle through all of the requestors, essentially utilizing brute force as opposed to a finesse technique of eliminating sparseness utilized by the large logic gate arrays. If there is not an active request, the pointer simply moves onto the next requestor in the series. The pointer only advances one requestor per cycle and stops when there is an active request. Hence, the amount of circuitry is reduced, but the technique is slow and the latency is increased.

However, within the second example, there are ways for the pointer to "jump" several requestors that are not active. The jumps, though, are limited by the cycles of a synchronous clock. Hence, the amount of gate delay becomes tremendously important. Previously, there was a requirement of a minimum of two NAND gates in order to provide a jump. Therefore, a jump is typically limited to a smaller number of requestors.

Therefore, there is a need for a method and/or apparatus for improving area efficiency and circuit speed for round robin selection logic that addresses at least some of the problems associated with conventional methods and apparatuses for round robin selection logic.

SUMMARY OF THE INVENTION

The present invention provides an apparatus and method for round robin selection. A plurality of requestors is a component of the apparatus and the method. Another component is a plurality of pointers wherein there is at least one pointer associated with each requester. Also, there is a plurality of sequences to advance from a pointer of a requester to a subsequent pointer associated with a subsequent requester in the sequential order wherein advancing through one sequence of the plurality of sequences requires a single gate delay.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
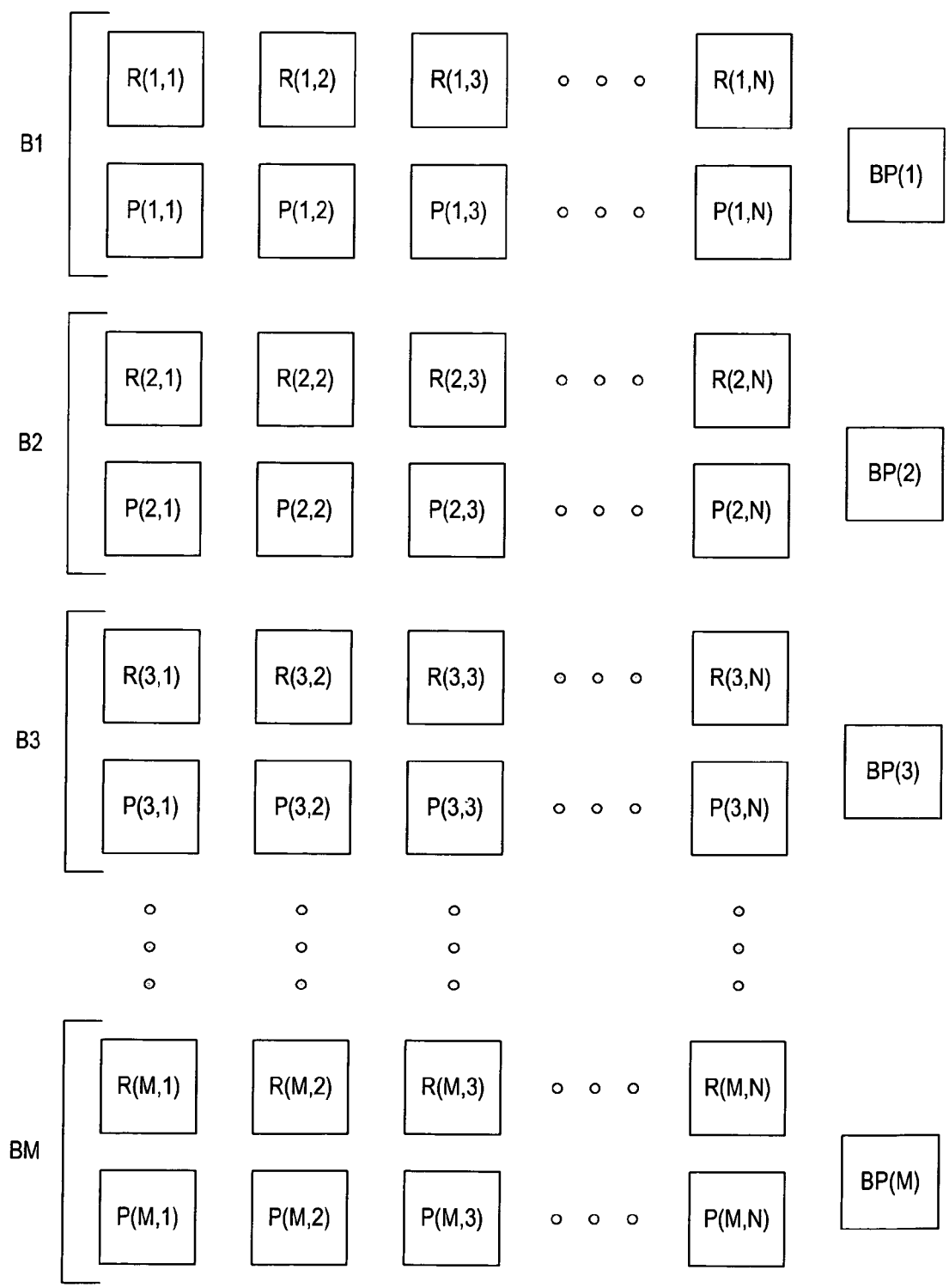
FIG. 1 is a block diagram depicting of the round robin requester array of an embodiment the apparatus disclosed.

Referring to FIG. 1 of the drawings, the reference numeral 100 generally designates a round robin requester array (array).

Within the array, there are banks of requestors, B1 to BM for the M bank. There are also requestors, R(1,1) to R(M,N) wherein the first position corresponds to bank number and the second position corresponds to the requester number. Also with the array there are pointers that correspond to each requester, P(1,1) to P(M,N) in a manner similar to the requestors. Finally, there are also break loop pointers, BP(1) to BP(M), associated with each requestor bank.

Figure 2:
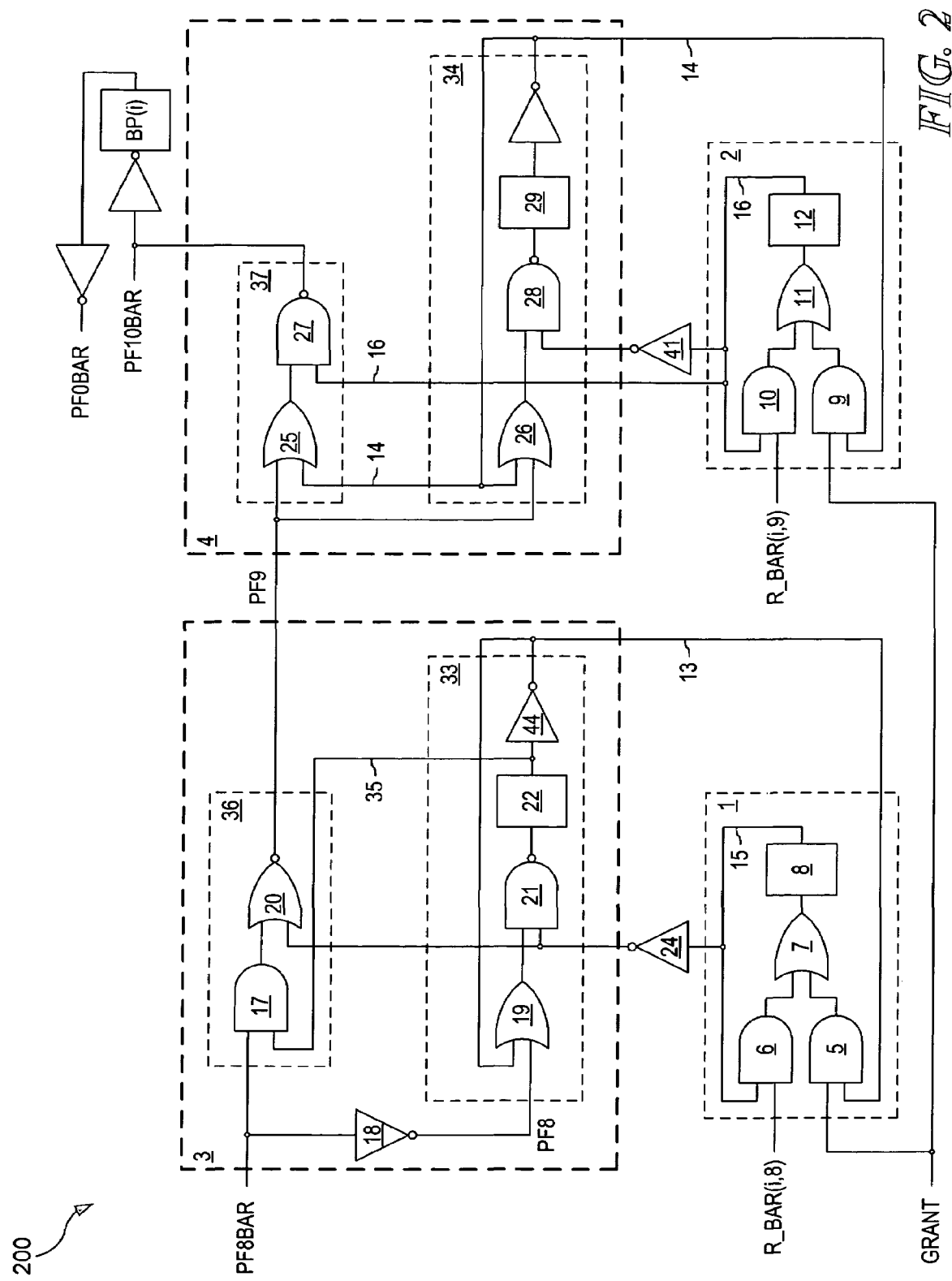
FIG. 2 is a block diagram depicting the sequential logic with the round robin requester array.

Referring to FIG. 2 of the drawings, the reference numeral 200 generally designates a block diagram depicting the sequential logic with the round robin requestor array for given requester bank.

The sequential logic of FIG. 2 illustrates all of the physical connections that exist within a given bank of requestors B1 to BM of FIG. 1. The banks B1 to BM of FIG. 1 operate independently. In FIG. 2, two requester latches 1 and 2 are depicted for a given bank, say Bi. Each requester latch 1 and 2 also has a respective pointing logic sequence 3 and 4 corresponding to the each requester R8 and R9, respectively.

Each of the requestor latches 1 and 2 has identical logic. An identical bank grant GRANT is input into AND-gates 5 and 9 along with a feedback from the requestor latch's respective pointing logic 13 and 14. Request signals R_bar (i,8) and R_bar(i,9) are simultaneously input into AND-gates 6 and 10 as well along with feedback from output of the requester latch's latch 8 and 12, respectively. The output from each of the requestor latch's AND-gates is then ORed 7 and 11 and fed into a latch 8 and 12. The output of the requester latch 8 and 12, which is active low, is then forwarded to the respective point logic 3 and 4 and fed back to the respective requestor latch 1 and 2.

Even though the requester latches 1 and 2 may be identical, each of the pointing logic sequences of the pair is different. The two pointing logic sequences 3 and 4 operate on a symmetrical AND-OR-Inverter/OR-AND-Inverter (AOI/OAI) system. Each of the symmetrical systems 3 and 4 have pointing latch sequences 33 and 34, and respective AOI 36 and OAI 37 sequences.

In the first pointing logic sequence 33, an output from the previous pointing logic sequence PF8bar, which is active low, is inverted 18. The inverted signal from the previous pointing logic sequence PF8 is fed into the first pointing latch sequence 33. Within the first pointing latch sequence 33, PF8 is ORed 19 with inverted feedback 13. The ORed signal from OR-gate 19 is then NANDed 21 with the inverted output 24 of the respective requestor latch 1. The NAND signal from NAND-gate 21 is then fed into a first pointer latch 22. The output, which is active low, from the first pointer latch 22 is fed 35 into the AOI logic 36 and is also inverted 44, wherein the inverted signal from the inverter 44 is fed back to the OR-gate 19 and to the AND-gate 5 in the first requester latch 1.

In the AOI logic sequence 36, inputs from the previous pointing logic sequence PF8bar, a non-inverted output 35 from the first pointing latch sequence 33, and an inverted output 24 from the first input sequence 1 are fed into the AOI sequence 36. The previous pointing logic sequence PF8bar and the non-inverted output 35 from the first pointing latch sequence 33 are ANDed 17. The output of the AND-gate 17 is then NORed 20 along with the inverted output 24 from the first input sequence 1, yielding an output PF9 from AOI sequence 36 that is active high.

In the second pointing logic sequence 34, an output PF9 from AOI sequence 36 inputs into the second pointing latch sequence 34. Within the second pointing latch sequence 34, PF9 is ORed 26 with inverted feedback 14. The ORed signal is then NANDed 28 with the inverted output 41 of the respective, second requester latch 2. The NAND signal of the NAND-gate 28 is then fed into a second pointer latch 29.

The output from the pointer latch 29 is inverted, wherein the inverted signal 14 is fed back to the OR-gate 26 and to the AND-gate 9 in the input second section 2.

In the OAI logic sequence 37, inputs from the AOI sequence PF9, an inverted output 14 from the second pointing latch sequence 34, and a non-inverted output 16 from the second input sequence 2 are fed into the OAI sequence 37. The AOI sequence PF9 and the inverted output 14 from the second pointing latch sequence 34 are ORed 25. The output of the OR-gate 25 is then NANDed 27 along with the non-inverted output 16 from the second input sequence 2, yielding an output PF10bar from OAI sequence 36 that is active low. If the OAI sequence 37 is associated with the final requestor in the bank, then the signal is inverted and fed into the Break Loop Pointer Register BP(i) terminating the round robin. Hence, the signal from the Break Loop Pointer Register BP(i) is inverted and fed back to the initial logic sequence in the bank associated with the initial requestor in the bank.

Moreover, the output of the OAI sequence PF10bar is then further utilized. From the output of the OAI sequence PF10bar, one is then able to determine whether there is an outstanding request anywhere within the entire bank based simply on the level of PF10bar. Hence, the use of an OR-gate with inputs from each requester in the bank is eliminated. Furthermore, the alternating polarity of the symmetrical AOI/OAI logic achieves a circuit performance of a single transistor gate delay per requestor stage during the pointer forwarding process. Hence, the amount of circuit is reduced, and the speed of the round robin system is greatly increased.

Figure 3:
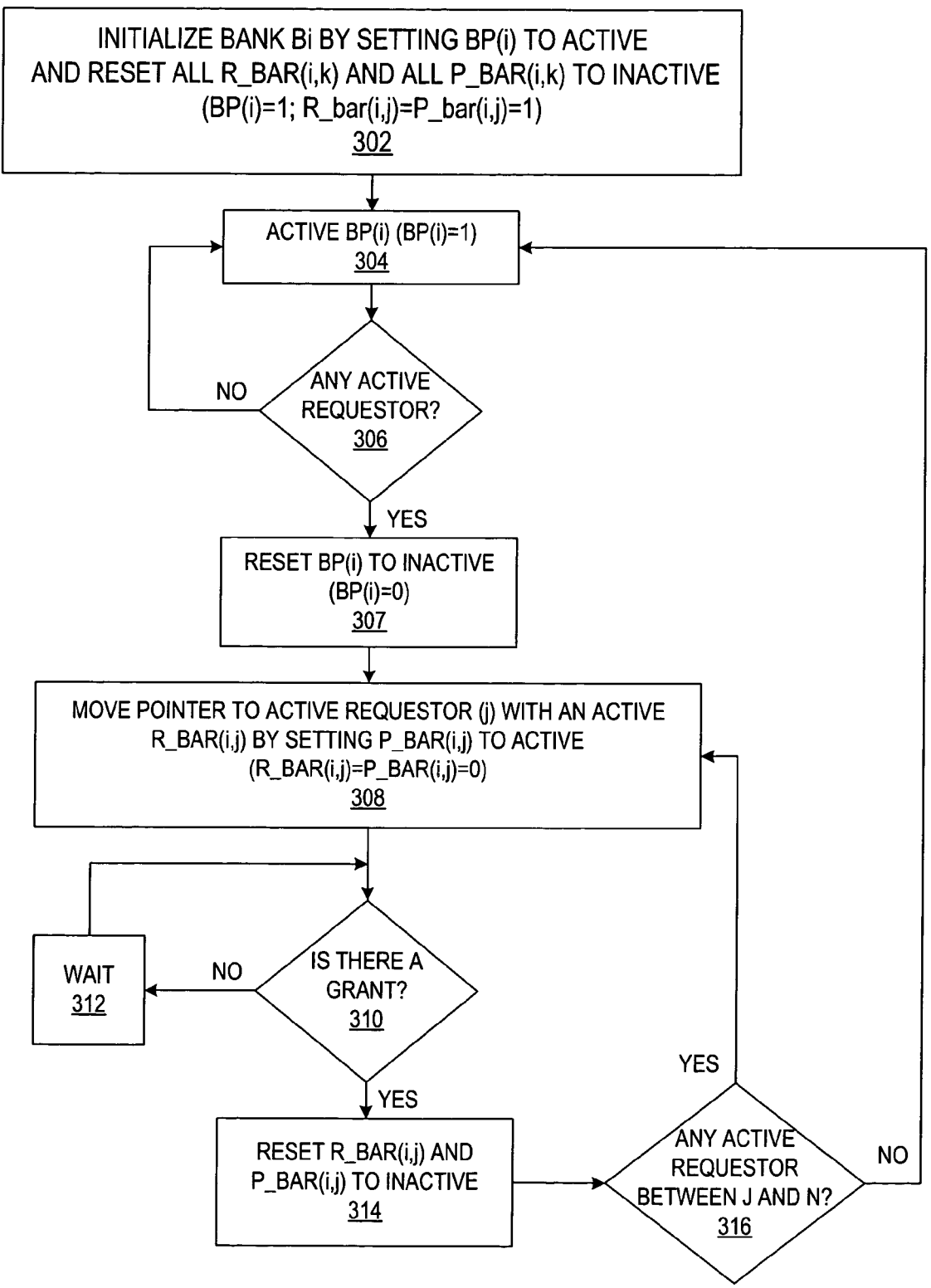
FIG. 3 is a flow chart depicting the operation of the apparatus disclosed.

Now, referring to FIG. 3 of the drawings, the reference numeral 300 generally designates the operation of the array of FIG. 1.

In step 302, for a given bank, say Bi, the bank Bi is initialized. All banks operate simultaneously and independently. When initialized, the break loop pointer BP(i) is set to active (BP(i)=1). All requestors R_bar(i, 1) to R_bar(i,n) are reset to inactive (R_bar(i,k)=1). Also, all pointers P_bar (i,1) to P_bar(i,n) are reset to inactive (P_bar(i,k)=1).

Once the bank is initialized, then the bank begins operation. At the very beginning, the break loop pointer B(i) is active (BP(i)=1) 304. The array then inquires as to whether a request is pending or a requester is active 306. If not, then the array waits at the break loop pointer B(i) 304. If there is an active request, then the break loop pointer BP(i) is reset to inactive (BP(i)=0) 307. The pointer P_bar(i,k) is then moved to the active requestor R_bar(i,j) by setting the pointer P_bar(i,j) to active 308. Once the respective pointer P_bar(i,j) and the respective requester R_bar(i,j) become active, the array waits for a grant 310 and 312. After the request is granted, the requestor R_bar(i,j) and the pointer P_bar(i,j) are reset to inactive or R_bar(i,j)=P_bar(i,j)=1 314.

Once the pending request is processed, then the array begins to cycle through the remainder of the bank. A determination is made as to whether there is an active request between the Jth requestor R_bar(i,j) and the Nth requester R_bar(i,n) 316. If there is a request between the Jth requester R_bar(i,j) and the Nth requestor R_bar(i,n), the pointer P_bar(i,k) is moved to the next active requester 308. If there is not a request between the Jth requestor R_bar(i,j) and the Nth requester R_bar(i,n), the pointer P_bar(i,k) is moved to the break loop pointer BP(i) 304.

It will be understood that a variety of logic gate types, types of logic, and types of latches may be utilized. Each of the logic gates may operate on Emitter Coupled Logic (ECL), Transistor-Transistor Logic (TTL), etc. without departing from the spirit of the present invention. Moreover, an equivalent set of logic gates may replace a single or series of logic gates without departing from the spirit of the present invention. For example, an OR-gate may be replaced with an equivalent NOT-NAND, where signals are inverted prior to being fed into a NAND-gate. There are also a variety of well-known latches, registers and the like that may be used.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for round robin selection, comprising:
providing an apparatus, comprising:
a plurality of units each coupled to receive a different one of a plurality of request signals, an input signal, and a grant signal, wherein each unit produces a pointer signal;
wherein the units are grouped to form a plurality of banks such that each bank includes at least two of the units;
wherein each of the banks comprises a break loop pointer unit;
wherein within each bank the units and the break loop pointer unit are connected in series such that the break loop pointer unit is coupled to receive a pointer signal produced by one of the units, and another one of the units is coupled to receive an output signal produced by the break loop pointer unit as the input signal;
wherein the output signal produced by a break loop pointer unit is indicative of an active request signal received by one of the units within the bank including the break loop pointer unit;
initializing one of the banks by setting the output signal produced by the break loop pointer unit of the bank to active, setting all of the request signals received by the units of the bank to inactive, and setting all of the pointer signals produced by the units of the bank to inactive;
determining if a request signal received by one of the units of the bank is active;
in the event a request signal received by one of the units of the bank is active:
setting the output signal produced by the break loop pointer unit of the bank to inactive;
setting the pointer signal produced by the unit receiving the active request signal to active;
waiting for the grant signal received by the unit receiving the active request signal to become active; and
inactivating the active request signal and the active pointer signal.

2. An apparatus for arbitrating among a plurality of requestors each producing a request signal, the apparatus comprising:
a plurality of requestor latches each coupled to receive a different one of the request signals and a grant signal, and configured to produce a latch output signal dependent upon the request signal and the grant signal;
a plurality of pointing logic sequence units each corresponding to a different one of the requester latches, wherein each of the pointing logic sequence units is coupled to receive an input signal and the latch output signal produced by the corresponding requester latch, and is configured to produce an output signal dependent upon the input signal and the latch output signal;
wherein the requestor latches and the corresponding pointing logic sequence units are grouped to form a plurality of banks such that each bank includes at least two of the requester latches and the corresponding pointing logic sequence units;
wherein each of the banks comprises a break loop pointer unit;
wherein within each bank, the pointing logic sequence units and the break loop pointer unit are connected in series such that the break loop pointer unit is coupled to receive an output signal produced by one of the pointing logic sequence units, and another one of the pointing logic sequence units is coupled to receive an output signal produced by the break loop pointer unit as the input signal; and
wherein the output signal produced by a break loop pointer unit is indicative of an asserted request signal received by a requestor latch within the bank including the break loop pointer unit.

3. The apparatus as recited in claim 2, wherein each of the requester latches comprises a latch.

4. The apparatus as recited in claim 3, wherein each of the requestor latches comprises an AND gate receiving the request signal and an output signal produced by the latch.

5. The apparatus as recited in claim 2, wherein each of the pointing logic sequence units comprises a latch.

6. The apparatus as recited in claim 2, wherein each of the pointing logic sequence units is configured to produce a first output signal and a second output signal dependent upon the input signal and the latch output signal, and wherein each of the requester latches is coupled to receive the second output signal and is configured to produce the latch output signal dependent upon the second output signal.

7. The apparatus as recited in claim 6, wherein each of the requestor latches comprises a latch, a first AND gate receiving the request signal and an output signal produced by the latch, and a second AND gate receiving the grant signal and the second output signal.

8. The apparatus as recited in claim 2, wherein each of the pointing logic sequence units comprises an AND-OR-INVERT sequence unit and a pointing latch sequence unit.

9. The apparatus as recited in claim 8, wherein each AND-OR-INVERT sequence unit comprises an AND gate and a NOR gate, wherein the AND gate is coupled to receive the input signal received by the pointing logic sequence unit including the AND-OR-INVERT sequence unit, and wherein the NOR gate is coupled to receive an output signal produced by the AND gate and the latch output signal, and is configured to produce the output signal of the pointing logic sequence unit including the AND-OR-INVERT sequence unit.

10. The apparatus as recited in claim 8, wherein each pointing latch sequence unit comprises a latch.

11. The apparatus as recited in claim 10, wherein within each pointing logic sequence unit, the AND-OR-INVERT sequence unit comprises an AND gate and a NOR gate, wherein the AND gate is coupled to receive the input signal received by the pointing logic sequence unit and an output signal produced by the latch of the pointing latch sequence unit, and wherein the NOR gate is coupled to receive an output signal produced by the AND gate and the latch output signal, and is configured to produce the output signal of the pointing logic sequence unit.

* * * * *